United States Patent
Billings et al.

(10) Patent No.: US 10,330,111 B2
(45) Date of Patent: Jun. 25, 2019

(54) GAS TURBINE ENGINE AIRFOIL

(71) Applicant: United Technologies Corporation, Farmington, CT (US)

(72) Inventors: Scott C. Billings, Marlborough, CT (US); Michael K. Gottschalk, Glastonbury, CT (US); William D. Owen, Windsor, CT (US); Edward J. Gallagher, West Hartford, CT (US); Darryl Whitlow, Middletown, CT (US); Sue-Li Chuang, Glastonbury, CT (US); Mani Sadeghi, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 358 days.

(21) Appl. No.: 15/126,371

(22) PCT Filed: Mar. 30, 2015

(86) PCT No.: PCT/US2015/023259
§ 371 (c)(1),
(2) Date: Sep. 15, 2016

(87) PCT Pub. No.: WO2015/153411
PCT Pub. Date: Oct. 8, 2015

(65) Prior Publication Data
US 2017/0122336 A1 May 4, 2017

Related U.S. Application Data

(60) Provisional application No. 61/974,169, filed on Apr. 2, 2014.

(51) Int. Cl.
*F02C 3/04* (2006.01)
*F04D 29/38* (2006.01)
(Continued)

(52) U.S. Cl.
CPC ........... *F04D 29/384* (2013.01); *F01D 5/141* (2013.01); *F02C 3/04* (2013.01); *F02C 7/36* (2013.01);
(Continued)

(58) Field of Classification Search
CPC .... F01D 5/141; F02C 3/04; F02C 7/36; F02K 3/06; F04D 29/384; F05D 2220/36;
(Continued)

(56) References Cited

U.S. PATENT DOCUMENTS 6,899,526 B2 * 5/2005 Doloresco ............... F01D 5/141
416/223 A
8,147,207 B2 4/2012 Orosa et al.
(Continued)

FOREIGN PATENT DOCUMENTS

WO 2013114030 8/2013
WO 2013115871 8/2013

OTHER PUBLICATIONS

International Preliminary Report on Patentability for PCT Application No. PCT/US2015/023259 dated Oct. 13, 2016.
(Continued)

*Primary Examiner* — Jesse S Bogue
(74) *Attorney, Agent, or Firm* — Carlson, Gaskey & Olds, P.C.

(57) ABSTRACT

In one exemplary embodiment, an airfoil for a turbine engine includes an airfoil that has pressure and suction sides and extends in a radial direction from a 0% span position at an inner flow path location to a 100% span position at an airfoil tip. The airfoil has a curve that corresponds to a relationship between a leading edge dihedral and a span position. The leading edge dihedral has a portion of the curve with a change in dihedral in the range of 90% to 100% span position of greater than 10°. A positive dihedral cor-
(Continued)

responds to suction side-leaning. A negative dihedral corresponds to pressure side-leaning.

24 Claims, 5 Drawing Sheets

(51) Int. Cl.
    *F01D 5/14*     (2006.01)
    *F02C 7/36*     (2006.01)
    *F02K 3/06*     (2006.01)

(52) U.S. Cl.
    CPC ............ *F02K 3/06* (2013.01); *F05D 2220/36* (2013.01); *F05D 2240/35* (2013.01); *F05D 2250/70* (2013.01); *Y02T 50/672* (2013.01); *Y02T 50/673* (2013.01)

(58) Field of Classification Search
    CPC ............ F05D 2240/35; F05D 2250/70; Y02T 50/672; Y02T 50/673
    See application file for complete search history.

(56) References Cited

U.S. PATENT DOCUMENTS

| | | | | |
|---|---|---|---|---|
| 8,167,567 | B2 * | 5/2012 | Kirchner | F01D 5/141 416/223 R |
| 8,464,426 | B2 | 6/2013 | Kirchner et al. | |
| 8,915,090 | B2 * | 12/2014 | Praisner | F01D 9/04 415/191 |
| 9,605,542 | B2 * | 3/2017 | Gallagher | F01D 5/141 |
| 2010/0054946 | A1 * | 3/2010 | Orosa | F04D 29/324 416/223 R |
| 2012/0243975 | A1 * | 9/2012 | Breeze-Stringfellow | F01D 5/141 415/173.1 |
| 2012/0243983 | A1 | 9/2012 | Breeze-Stringfellow et al. | |
| 2012/0244005 | A1 * | 9/2012 | Breeze-Stringfellow | F01D 5/141 416/223 A |
| 2013/0224040 | A1 * | 8/2013 | Straccia | F01D 5/141 416/242 |
| 2015/0017012 | A1 * | 1/2015 | Pouzadoux | F01D 5/141 416/225 |
| 2015/0354367 | A1 * | 12/2015 | Gallagher | F01D 5/14 60/805 |
| 2016/0195104 | A1 * | 7/2016 | Cellier | F04D 29/384 416/223 A |

OTHER PUBLICATIONS

European Search Report for European Patent application No. 15774355.0 dated Mar. 13, 2017.
International Search Report & Written Opinion for PCT International Application No. PCT/US2015/023259 dated Jul. 14, 2015.

* cited by examiner

GAS TURBINE ENGINE AIRFOIL

CROSS-REFERENCE TO RELATED APPLICATIONS

This application claims priority to U.S. Provisional Application No. 61/974,169 which was filed on Apr. 2, 2014 and is incorporated herein by reference.

BACKGROUND

This disclosure relates generally to an airfoil for gas turbine engines, and more particularly to the anhedral or dihedral angle of a fan or compressor blade's tip geometry.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The propulsive efficiency of a gas turbine engine depends on many different factors, such as the design of the engine and the resulting performance debits on the fan that propels the engine. As an example, the fan may rotate at a high rate of speed such that air passes over the fan airfoils at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

In one exemplary embodiment, an airfoil for a turbine engine includes an airfoil that has pressure and suction sides and extends in a radial direction from a 0% span position at an inner flow path location to a 100% span position at an airfoil tip. The airfoil has a curve that corresponds to a relationship between a leading edge dihedral and a span position. The leading edge dihedral has a portion of the curve with a change in dihedral in the range of 90% to 100% span position of greater than 10°. A positive dihedral corresponds to suction side-leaning. A negative dihedral corresponds to pressure side-leaning.

In a further embodiment of the above, the portion has a negative dihedral angle and ends with a positive dihedral angle at the 100% span position.

In a further embodiment of any of the above, the dihedral angle is greater than 10° at the 100% span position.

In a further embodiment of any of the above, the dihedral angle is greater than 15° at the 100% span position.

In a further embodiment of any of the above, the dihedral angle is greater than 20° at the 100% span position.

In a further embodiment of any of the above, the dihedral angle is greater than 25° at the 100% span position.

In a further embodiment of any of the above, the dihedral angle is positive from the 0% span position to the portion.

In a further embodiment of any of the above, the curve includes an increasingly negative dihedral angle immediately preceding the portion.

In a further embodiment of any of the above, the airfoil has another curve corresponding to a relationship between a leading edge sweep and a span position. A negative sweep angle opposes a direction of velocity. A positive sweep angle does not oppose the direction of velocity. The sweep angle is positive at the 0% span position and the 100% span position.

In a further embodiment of any of the above, the sweep angle is negative in a range of 20% span position.

In a further embodiment of any of the above, the sweep angle is at least 20° at 70% span position.

In a further embodiment of any of the above, the dihedral in the range of 90% to 100% span is generally linear.

In a further embodiment of any of the above, the airfoil is a fan blade for a gas turbine engine.

In another exemplary embodiment, a gas turbine engine includes a combustor section that is arranged between a compressor section and a turbine section. A fan section has an array of twenty-six or fewer fan blades. The fan section has a low fan pressure ratio of less than 1.55. A geared architecture couples the fan section to the turbine section or compressor section. The fan blades include an airfoil that has pressure and suction sides. The airfoil extends in a radial direction from a 0% span position at an inner flow path location to a 100% span position at an airfoil tip. The airfoil has a relationship between a leading edge dihedral and a span position. The leading edge dihedral has a portion of the curve with a change in dihedral in the range of 90% to 100% span position of greater than 10°. A positive dihedral corresponds to suction side-leaning. A negative dihedral corresponds to pressure side-leaning.

In a further embodiment of any of the above, the portion has a negative dihedral angle and ends with a positive dihedral angle at the 100% span position.

In a further embodiment of any of the above, the dihedral angle is greater than 10° at the 100% span position.

In a further embodiment of any of the above, the dihedral angle is greater than 15° at the 100% span position.

In a further embodiment of any of the above, the dihedral angle is greater than 20° at the 100% span position.

In a further embodiment of any of the above, the dihedral angle is greater than 25° at the 100% span position.

In a further embodiment of any of the above, the dihedral angle is positive from the 0% span position to the portion.

In a further embodiment of any of the above, the curve includes an increasingly negative dihedral angle immediately preceding the portion.

In a further embodiment of any of the above, the airfoil has another curve that corresponds to a relationship between a leading edge sweep and a span position. A negative sweep angle opposes a direction of velocity. A positive sweep angle does not oppose the direction of velocity. The sweep angle is positive at the 0% span position and the 100% span position.

In a further embodiment of any of the above, the sweep angle is negative in a range of 20% span position.

In a further embodiment of any of the above, the sweep angle is at least 20° at 70% span position.

In a further embodiment of any of the above, the dihedral in the range of 90% to 100% span is generally linear.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
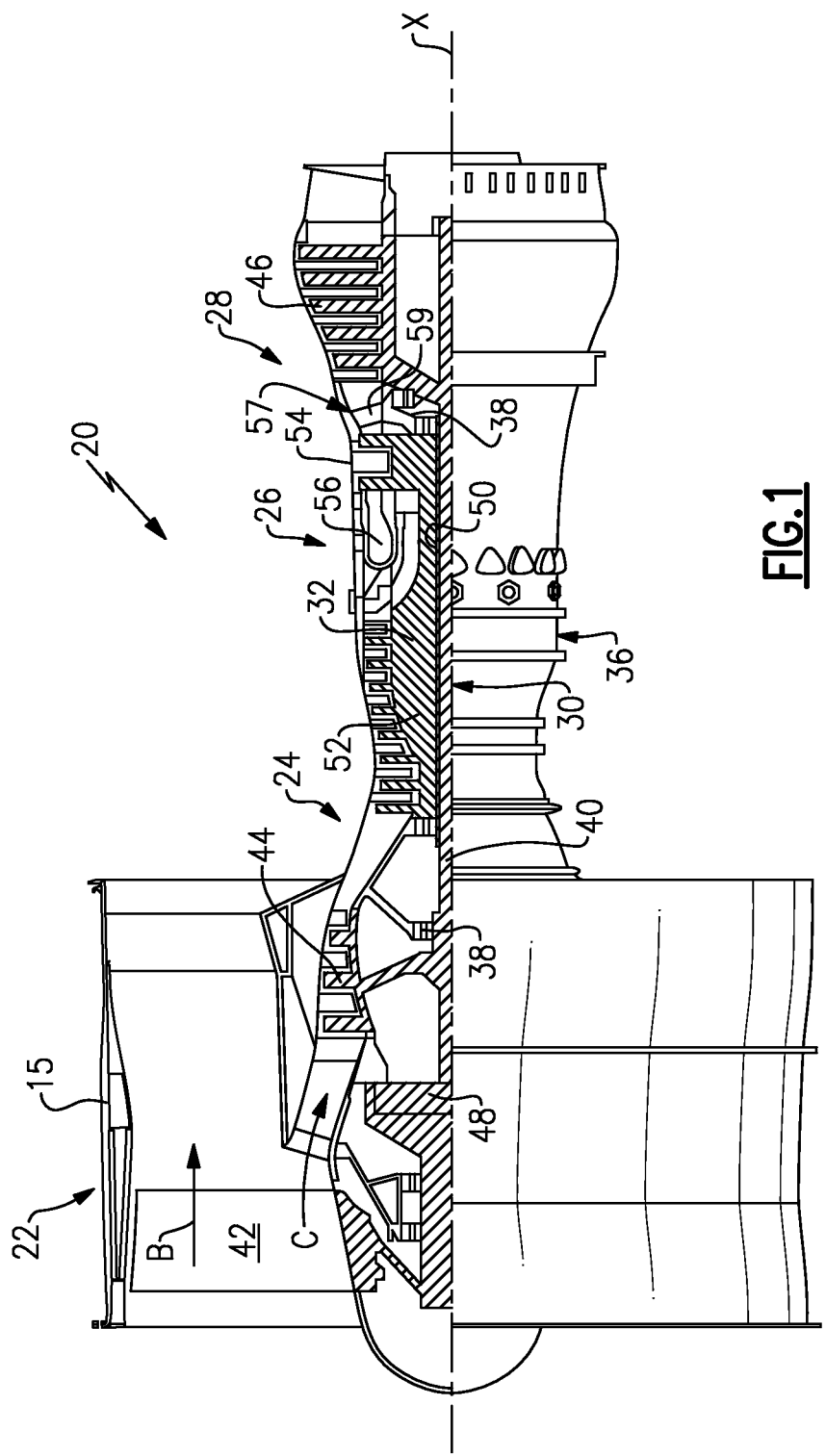
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second. The "low corrected fan tip speed" as disclosed herein according to another non-limiting embodiment is less than about 1200 ft/second.

Figure 2A:
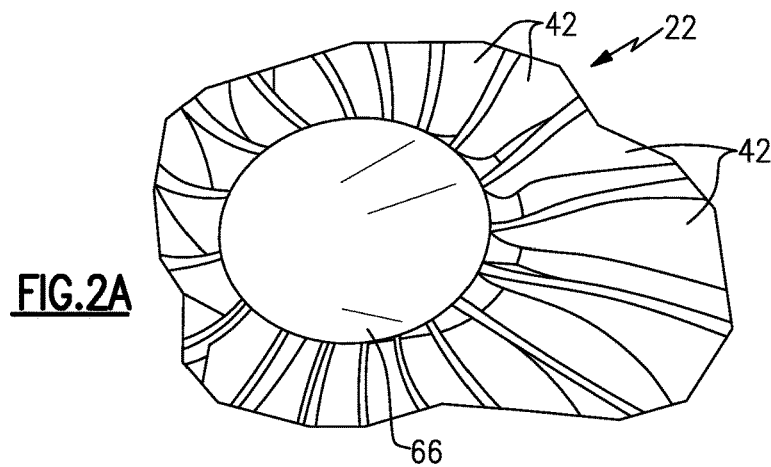
FIG. 2A is a perspective view of a portion of a fan section.
Figure 2B:
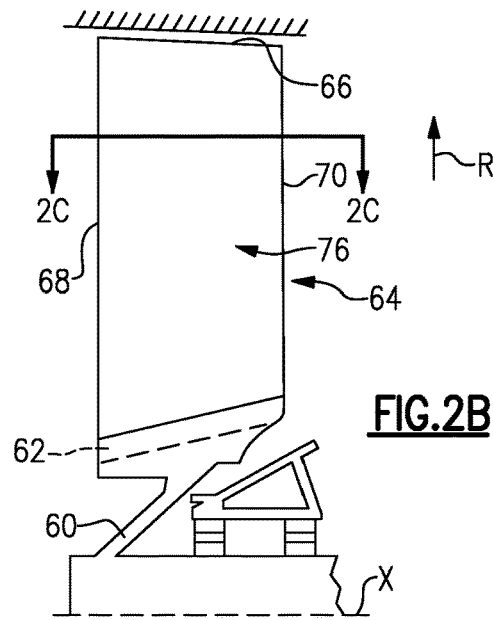
FIG. 2B is a schematic cross-sectional view of the fan section.
Figure 2C:
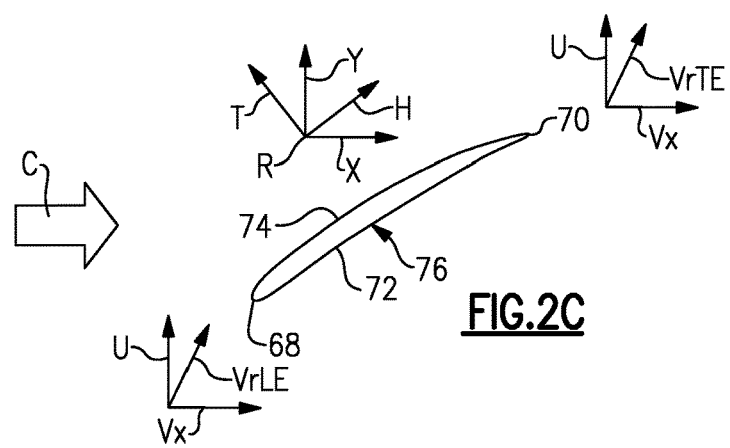
FIG. 2C is a cross-sectional view a fan blade taken along line 2C-2C in FIG. 2B, illustrating velocity.

Referring to FIG. 2A-2C, the fan blade 42 is supported by a fan hub 60 that is rotatable about the axis X. Each fan blade 42 includes an airfoil 64 extending in a radial span direction R from a root 62 to a tip 66. A 0% span position corresponds to a section of the airfoil 64 at the inner flow path (e.g., a platform), and a 100% span position corresponds to a section of the airfoil 64 at the tip 66.

The root 62 is received in a correspondingly shaped slot in the fan hub 60. The airfoil 64 extends radially outward of the platform, which provides the inner flow path. The platform may be integral with the fan blade or separately secured to the fan hub, for example. A spinner 66 is supported relative to the fan hub 60 to provide an aerodynamic inner flow path into the fan section 22. The disclosed airfoil may also be used for integrally bladed rotors.

The airfoil 64 has an exterior surface 76 providing a contour that extends from a leading edge 68 aftward in a chord-wise direction H to a trailing edge 70, as shown in FIG. 2C. Pressure and suction sides 72, 74 join one another at the leading and trailing edges 68, 70 and are spaced apart from one another in an airfoil thickness direction T. An array of the fan blades 42 are positioned about the axis X in a circumferential or tangential direction Y. Any suitable number of fan blades may be used in a given application.

The exterior surface 76 of the airfoil 64 generates lift based upon its geometry and directs flow along the core flow path C. The fan blade 42 may be constructed from a composite material, or an aluminum alloy or titanium alloy, or a combination of one or more of these. The disclosed airfoil may also be constructed from steel or a nickel alloy. Abrasion-resistant coatings or other protective coatings may be applied to the fan blade 42. The curves and associated values assume a fan in a hot, running condition (typically cruise).

Figure 3A:
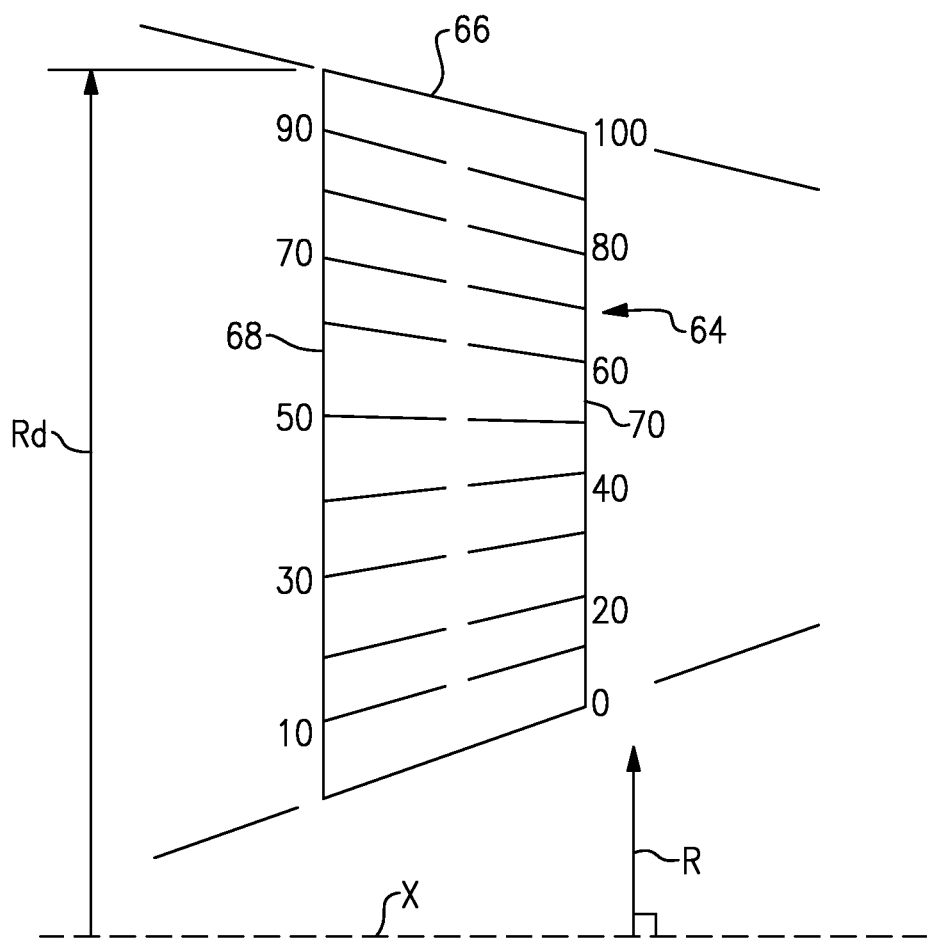
FIG. 3A is a schematic view of fan blade span positions for an airfoil without any curvature at the leading and trailing edges.

One characteristic of fan blade performance relates to the fan blade's leading and trailing edge sweep angles relative to a particular span position (R direction). Referring to FIG. 3A, span positions are schematically illustrated from 0% to 100% in 10% increments. Each section at a given span position is provided by a conical cut that corresponds to the shape of the core flow path, as shown by the large dashed lines. In the case of a fan blade with an integral platform, the 0% span position corresponds to the radially innermost location where the airfoil meets the fillet joining the airfoil to the platform. In the case of a fan blade without an integral platform, the 0% span position corresponds to the radially innermost location where the discrete platform meets the exterior surface of the airfoil.

The axial velocity Vx (FIG. 2C) of the core flow C is substantially constant across the radius of the flowpath. However the linear velocity U of a rotating airfoil increases with increasing radius. Accordingly, the relative velocity Vr of the working medium at the airfoil leading edge increases with increasing radius, and at high enough rotational speeds, the airfoil experiences supersonic working medium flow velocities in the vicinity of its tip. The relative velocity at the leading edge 68 is indicated as $Vr_{LE}$, and the relative velocity at the trailing edge 70 is indicated as $Vr_{TE}$.

Figure 3B:
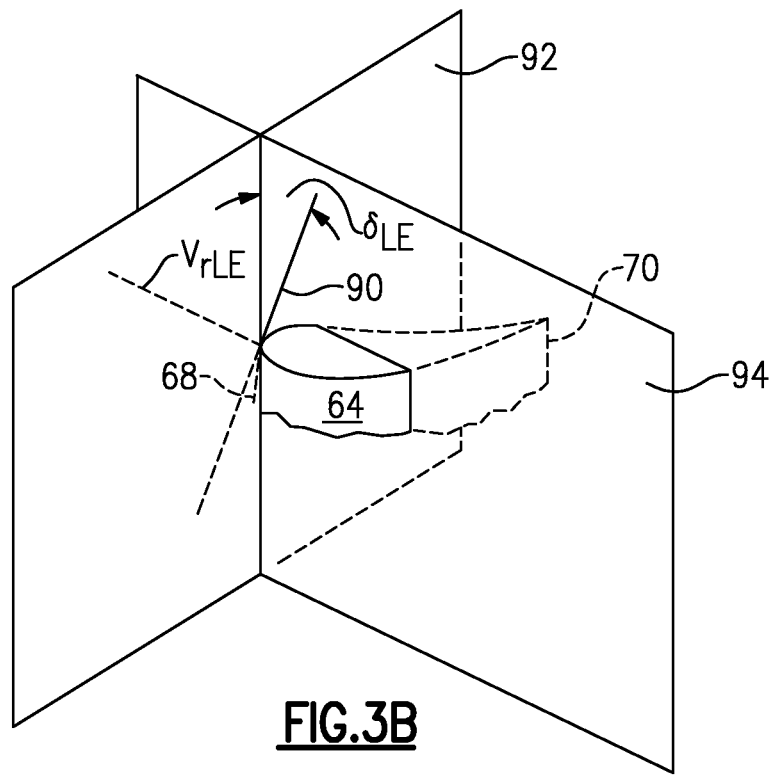
FIG. 3B is a schematic perspective view of an airfoil fragment illustrating the definition of a leading edge sweep angle.

Supersonic flow over an airfoil, while beneficial for maximizing the pressurization of the working medium, has the undesirable effect of reducing fan efficiency by introducing losses in the working medium's total pressure. Therefore, it is typical to sweep the airfoil's leading edge over at least a portion of the blade span so that the working medium velocity component in the chordwise direction (perpendicular to the leading edge) is subsonic. Since the relative velocity Vr increases with increasing radius, the sweep angle typically increases with increasing radius as well. As shown in FIG. 3B, the sweep angle δ at any arbitrary radius Rd (FIG. 3A) at the leading edge 68 is indicated as $δ_{LE}$.

Referring to FIG. 3B, the leading edge sweep angle $δ_{LE}$ is the acute angle between a line 90 tangent to the leading edge 68 of the airfoil 64 and a plane 92 perpendicular to the relative velocity vector $Vr_{LE}$. The sweep angle is measured in plane 94, which contains both the relative velocity vector $Vr_{LE}$ and the tangent line 90 and is perpendicular to plane 92. FIG. 5A is provided in conformance with this definition of the leading edge sweep angle $δ_{LE}$.

A positive X value corresponds to the aftward direction along the engine's axis of rotation. A negative X value corresponds to the forward direction along the engine's axis of rotation. Thus, a negative sweep angle opposes the direction of velocity, and a positive sweep angle does not oppose the direction of velocity.

Figure 4:
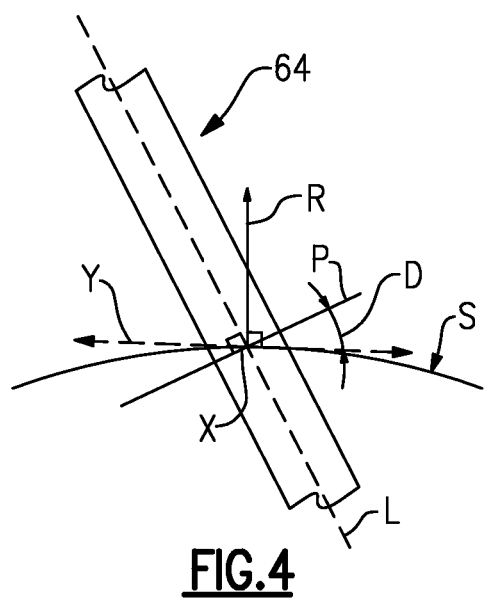
FIG. 4 is a schematic representation of a dihedral angle for an airfoil.

An aerodynamic dihedral angle D (simply referred to as "dihedral" or "dihedral angle" herein) is schematically illustrated in FIG. 4 for a simple airfoil. An axisymmetric stream surface S passes through the airfoil 64 at a location that corresponds to a span location (FIG. 3A). For the sake of simplicity, the dihedral D relates to the angle at which a line L along the leading or trailing edge, or any other point(s) along the airfoil chord, tilts with respect to the stream surface S. A plane P is normal to the line L and forms an angle with the tangential direction Y, providing the dihedral D. A positive dihedral D corresponds to the line tilting toward the suction side (suction side-leaning), and a negative dihedral D, or anhedral, corresponds to the line tilting toward the pressure side (pressure side-leaning). The method of determining and calculating the dihedral for more complex airfoil geometries is disclosed in Smith Jr., Leroy H., and Yeh, Hsuan "Sweep and Dihedral Effects in Axial-Flow Turbomachinery." *J. Basic Eng*. Vol. 85 Iss. 3, pp. 401-414 (Sep. 1, 1963), which is incorporated by reference in its entirety.

Figure 5B:
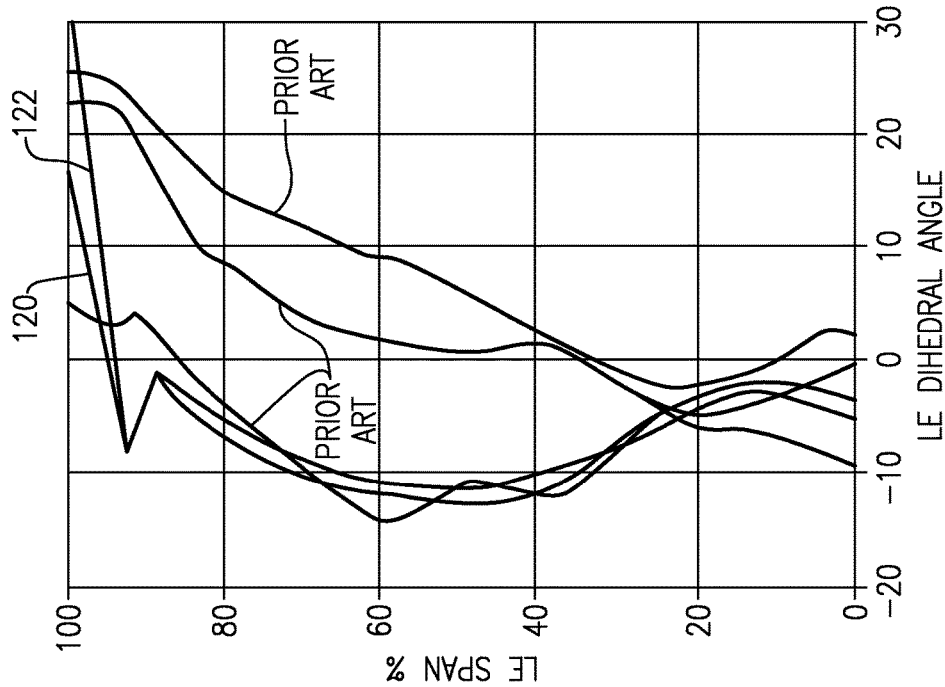
FIG. 5B illustrates a relationship between a leading edge dihedral angle and a span position for the set of example airfoils and several prior art curves.
Figure 5A:
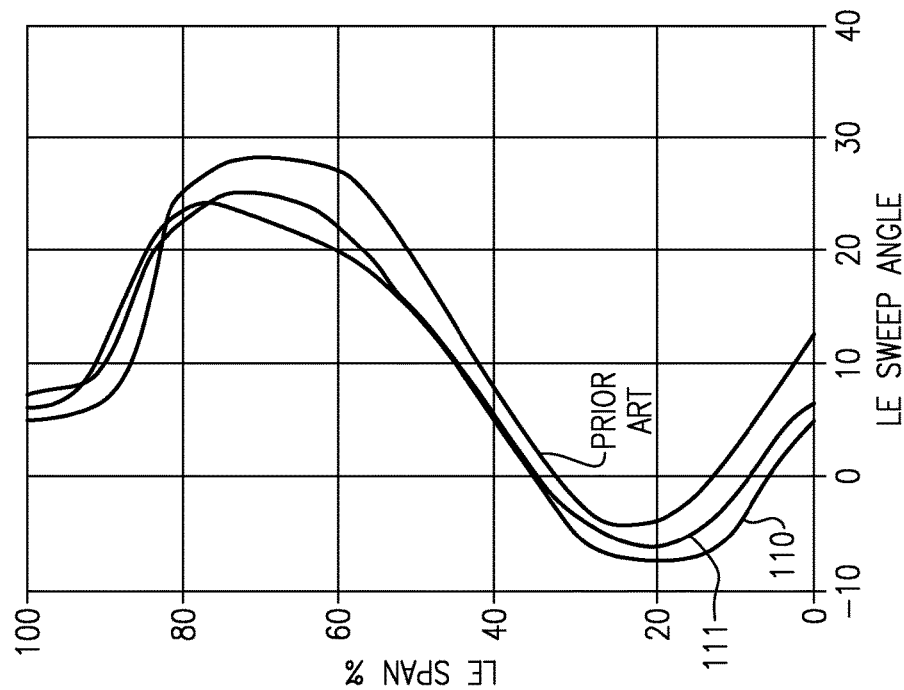
FIG. 5A graphically illustrates a leading edge sweep angle relative to a span position for a set of example airfoils and a prior art airfoil.

Several example fan blades are shown in each of the graphs in FIGS. 5A-5B, each blade represented by a curve. Referring to FIG. 5A, the airfoil has a curves 110 or 111 corresponding to a relationship between a leading edge sweep angle (LE Sweep Angle) and a span position (LE Span %). A prior art curve is also shown for reference. The curves illustrate a leading edge sweep angle. In the example, the sweep angle is positive at the 0% span position and the 100% span position. In one example, the sweep angle is negative in a range of 20% span position, and the sweep angle is at least 20° at 70% span position. It should be understood that other sweep curves may be used in conjunction with the disclosed leading edge dihedral.

Referring to FIG. 5B, several example curves 120, 122 are shown. Several prior art curves are also shown for reference The airfoil has a curve corresponding to a relationship between a leading edge dihedral (LE Dihedral Angle) and a span position (LE Span %). The leading edge dihedral has a portion of the curve with a change in dihedral in the range of 90% to 100% span position of greater than 10°. In the examples, the portion is generally linear. In the examples, the portion has a negative dihedral angle, about −8°, and ends with a positive dihedral angle at the 100% span position. In one example, the dihedral angle is greater than 10° at the 100% span position (for example, curves 120, 122). In another example, the dihedral angle is greater than 15°, 20° and/or 25° at the 100% span position (for example, curve 122).

In the examples, the dihedral angle is positive from the 0% span position to the portion, and the curve includes an increasingly negative dihedral angle immediately preceding the portion.

The disclosed dihedral angle is selected to maintain the aerodynamic efficiency and stability while improving the stresses at the blade tip as well as other areas of the airfoil. Fan blade vibration in chord-wise tip modes (bending between leading and trailing edges) can be excited in the engine environment, resulting in potentially dangerous stress levels at the blade tip. Incorporation of a large change in dihedral to the tip section alters the structural vibratory mode shape in a beneficial way, reducing the stress at the critical tip locations and altering the mode shape and/or natural frequency such that engine excitation of the associated vibratory modes is reduced. The disclosed dihedral allows for engine operation with chord-wise tip modes without need to add additional thickness to the airfoil, which would normally be needed to move the tip modes out of the operating range. Moreover, desired camber, chord and other airfoil design parameters may be substantially retained with the disclosed dihedral. Dihedral bend of the tip is performed in such a way to minimize the aerodynamic penalty.

It should also be understood that although a particular component arrangement is disclosed in the illustrated embodiment, other arrangements will benefit here from. Although particular step sequences may be shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a turbine engine comprising:
an airfoil having pressure and suction sides and extending in a radial direction from a 0% span position at an inner flow path location to a 100% span position at an airfoil tip, wherein the airfoil has a curve corresponding to a relationship between a leading edge dihedral and a span position, the leading edge dihedral having a portion of the curve with a cumulative change in dihedral in the range of 90% to 100% span position of greater than 10°, wherein a positive dihedral corresponds to suction side-leaning, and a negative dihedral corresponds to pressure side-leaning, wherein the portion has a negative dihedral angle and ends with a positive dihedral angle at the 100% span position, wherein the dihedral angle is greater than 10° at the 100% span position.

2. The airfoil according to claim 1, wherein the curve includes an increasingly negative change in dihedral angle immediately preceding the portion.

3. The airfoil according to claim 1, wherein a change of curvature in the range of 90% to 100% span is linear.

4. The airfoil according to claim 1, wherein the airfoil is a fan blade for a gas turbine engine.

5. The airfoil according to claim 1, wherein the change in dihedral is absolute.

6. The airfoil according to claim 5, wherein the change in dihedral is positive.

7. An airfoil for a turbine engine comprising:
an airfoil having pressure and suction sides and extending in a radial direction from a 0% span position at an inner flow path location to a 100% span position at an airfoil tip, wherein the airfoil has a curve corresponding to a relationship between a leading edge dihedral and a span position, the leading edge dihedral having a portion of the curve with a cumulative change in dihedral in the range of 90% to 100% span position of greater than 10°, wherein a positive dihedral corresponds to suction side-leaning, and a negative dihedral corresponds to pressure side-leaning, wherein the portion has a negative dihedral angle and ends with a positive dihedral angle at the 100% span position, wherein the dihedral angle is greater than 15° at the 100% span position.

8. The airfoil according to claim 7, wherein the dihedral angle is greater than 20° at the 100% span position.

9. The airfoil according to claim 8, wherein the dihedral angle is greater than 25° at the 100% span position.

10. An airfoil for a turbine engine comprising:
an airfoil having pressure and suction sides and extending in a radial direction from a 0% span position at an inner flow path location to a 100% span position at an airfoil tip, wherein the airfoil has a curve corresponding to a relationship between a leading edge dihedral and a span position, the leading edge dihedral having a portion of the curve with a cumulative change in dihedral in the range of 90% to 100% span position of greater than 10°, wherein a positive dihedral corresponds to suction side-leaning, and a negative dihedral corresponds to pressure side-leaning, wherein the portion has a negative dihedral angle and ends with a positive dihedral angle at the 100% span position, wherein the dihedral angle is positive at the 0% span position.

11. An airfoil for a turbine engine comprising:
an airfoil having pressure and suction sides and extending in a radial direction from a 0% span position at an inner flow path location to a 100% span position at an airfoil tip, wherein the airfoil has a curve corresponding to a relationship between a leading edge dihedral and a span position, the leading edge dihedral having a portion of the curve with a cumulative change in dihedral in the range of 90% to 100% span position of greater than 10°, wherein a positive dihedral corresponds to suction side-leaning, and a negative dihedral corresponds to pressure side-leaning, wherein the airfoil has another curve corresponding to a relationship between a leading edge sweep and a span position, wherein a negative sweep angle opposes a direction of velocity relating to the direction of movement of the airfoil, and a positive sweep angle does not oppose the direction of velocity, wherein the sweep angle is positive at the 0% span position and the 100% span position, wherein the sweep angle is negative at the 20% span position.

12. The airfoil according to claim 11, wherein the sweep angle is at least 20° at 70% span position.

13. A gas turbine engine comprising:
a combustor section arranged between a compressor section and a turbine section;
a fan section having an array of twenty-six or fewer fan blades, wherein the fan section has a low fan pressure ratio of less than 1.55;
a geared architecture coupling the fan section to the turbine section or compressor section; and
wherein the fan blades include an airfoil having pressure and suction sides, the airfoil extends in a radial direction from a 0% span position at an inner flow path location to a 100% span position at an airfoil tip, wherein the airfoil has a relationship between a leading edge dihedral and a span position, the leading edge dihedral having a portion of the curve with a cumulative change in dihedral in the range of 90% to 100% span position of greater than 10°, wherein a positive dihedral corresponds to suction side-leaning, and a negative dihedral corresponds to pressure side-leaning, wherein the portion has a negative dihedral angle and ends with a positive dihedral angle at the 100% span position, wherein the dihedral angle is greater than 10° at the 100% span position.

14. The gas turbine engine according to claim 13, wherein the dihedral angle is greater than 15° at the 100% span position.

15. The gas turbine engine according to claim 14, wherein the dihedral angle is greater than 20° at the 100% span position.

16. The gas turbine engine according to claim 15, wherein the dihedral angle is greater than 25° at the 100% span position.

17. The gas turbine engine according to claim 13, wherein the curve includes an increasingly negative change in dihedral angle immediately preceding the portion.

18. The gas turbine engine according to claim 13, wherein a change of curvature in the range of 90% to 100% span is linear.

19. The gas turbine engine according to claim 13, wherein the change in dihedral is absolute.

20. The gas turbine engine according to claim 19, wherein the change in dihedral is positive.

21. A gas turbine engine comprising:
a combustor section arranged between a compressor section and a turbine section;
a fan section having an array of twenty-six or fewer fan blades, wherein the fan section has a low fan pressure ratio of less than 1.55;
a geared architecture coupling the fan section to the turbine section or compressor section; and
wherein the fan blades include an airfoil having pressure and suction sides, the airfoil extends in a radial direction from a 0% span position at an inner flow path location to a 100% span position at an airfoil tip, wherein the airfoil has a relationship between a leading edge dihedral and a span position, the leading edge dihedral having a portion of the curve with a cumulative change in dihedral in the range of 90% to 100% span position of greater than 10°, wherein a positive dihedral corresponds to suction side-leaning, and a negative dihedral corresponds to pressure side-leaning, wherein the portion has a negative dihedral angle and ends with a positive dihedral angle at the 100% span position, wherein the dihedral angle is positive at the 0% span position.

22. A gas turbine engine comprising:
a combustor section arranged between a compressor section and a turbine section;
a fan section having an array of twenty-six or fewer fan blades, wherein the fan section has a low fan pressure ratio of less than 1.55;
a geared architecture coupling the fan section to the turbine section or compressor section; and
wherein the fan blades include an airfoil having pressure and suction sides, the airfoil extends in a radial direction from a 0% span position at an inner flow path location to a 100% span position at an airfoil tip, wherein the airfoil has a relationship between a leading edge dihedral and a span position, the leading edge dihedral having a portion of the curve with a cumulative change in dihedral in the range of 90% to 100% span position of greater than 10°, wherein a positive dihedral corresponds to suction side-leaning, and a negative dihedral corresponds to pressure side-leaning, wherein the sweep angle is negative at the 20% span position.

23. The gas turbine engine according to claim 22, wherein the airfoil has another curve corresponding to a relationship between a leading edge sweep and a span position, wherein a negative sweep angle opposes a direction of velocity relating to the direction of movement of the airfoil, and a positive sweep angle does not oppose the direction of velocity, wherein the sweep angle is positive at the 0% span position and the 100% span position.

24. The gas turbine engine according to claim 22, wherein the sweep angle is at least 20° at 70% span position.

* * * * *